United States Patent
Yoshii et al.

(10) Patent No.: US 9,446,728 B2
(45) Date of Patent: Sep. 20, 2016

(54) VEHICLE

(71) Applicant: KABUSHIKI KAISHA TOYOTA JIDOSHOKKI, Aichi-ken (JP)

(72) Inventors: Takeshi Yoshii, Kariya (JP); Taizo Kondo, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 0 days.

(21) Appl. No.: 14/644,620

(22) Filed: Mar. 11, 2015

(65) Prior Publication Data
US 2015/0258952 A1   Sep. 17, 2015

(30) Foreign Application Priority Data
Mar. 12, 2014  (JP) .................................. 2014-049382

(51) Int. Cl.
| B60R 19/54 | (2006.01) |
| B62D 25/16 | (2006.01) |
| B60R 19/02 | (2006.01) |
| B60R 21/00 | (2006.01) |

(52) U.S. Cl.
CPC ............... *B60R 19/54* (2013.01); *B60R 19/02* (2013.01); *B62D 25/16* (2013.01); *B60R 2021/0023* (2013.01)

(58) Field of Classification Search
CPC ........ B60R 19/00; B60R 19/54; B62D 25/16
See application file for complete search history.

(56) References Cited

U.S. PATENT DOCUMENTS

| 3,881,742 A * | 5/1975 | Felzer ..................... B60R 19/00 280/784 |
| 5,348,113 A | 9/1994 | Drvota et al. |
| 6,027,159 A * | 2/2000 | Baumann ............... B62D 21/52 296/187.03 |
| 6,364,358 B1 * | 4/2002 | Miller .................... B62D 25/04 28/784 |
| 6,460,889 B2 * | 10/2002 | Iyanagi ................. B62D 21/152 280/784 |
| 7,441,829 B2 * | 10/2008 | Baumann ............. B62D 21/152 296/187.03 |
| 8,136,867 B2 * | 3/2012 | Hirano ................... B62D 25/16 296/180.1 |
| 2013/0161932 A1 * | 6/2013 | Murray ................. B62D 21/15 280/784 |
| 2015/0084322 A1 * | 3/2015 | Killian ................. B60B 21/026 280/784 |

FOREIGN PATENT DOCUMENTS

| DE | 102004021165 A1 * | 11/2005 | ............. B60R 19/00 |
| GB | 2482002 A * | 1/2012 | ............. B62D 21/15 |
| JP | 6-51019 | 7/1994 | |
| JP | 10-297399 | 11/1998 | |
| JP | 2013-530877 | 8/2013 | |
| JP | 2014-34382 | 2/2014 | |
| WO | 2012/007726 | 1/2012 | |

OTHER PUBLICATIONS

Office Action issued in Japan Counterpart Patent Appl. No. 2014-049382, dated Jan. 26, 2016.

* cited by examiner

*Primary Examiner* — Darlene Condra
(74) *Attorney, Agent, or Firm* — Greenblum & Bernstein, P.L.C.

(57) ABSTRACT

A vehicle includes a vehicle body having a front wheel housing, an axle, a disk wheel fixed to the axle in the front wheel housing and a tire mounted on the disk wheel. The vehicle further includes a breaking member that is provided projecting from the vehicle body toward the disk wheel. The breaking member breaks the disk wheel when the vehicle body is crashed at a front thereof at a predetermined speed or higher.

3 Claims, 5 Drawing Sheets

VEHICLE

BACKGROUND OF THE INVENTION

The present invention relates to a vehicle.

Japanese Translation of PCT International Application Publication No. JP-T-2013-530877 discloses a conventional vehicle. The vehicle has a vehicle body having therein a front wheel housing, a disk wheel and a tire. The disk wheel is fixed to an axle of the vehicle in the front wheel housing. The tire is mounted on the disk wheel. The vehicle has a side sill located on the rear side of the front wheel housing and having a high strength.

In the event of crashing of the vehicle at the front thereof, the tire and the disk wheel are displaced backward and collide against the side sill of the vehicle body. Breakage of the tire and the disk wheel by the collision absorbs the collision energy. In addition, the side sill prevents the deformation of the vehicle compartment.

In recent years, the small overlap crash test has been attracting the attention of those skilled in the art to which the present invention pertains as a method for evaluating the safety of passengers in the vehicle when the vehicle is crashed at a specified speed against a barrier which is set at such a position that a predetermined percent of the total width of the vehicle strike the barrier on the driver side. In the vehicle of the above-cited Publication, there is a fear that the disk wheel may break the passenger compartment of the vehicle in the small overlap crash test.

The present invention, which has been made in light of the problems mentioned above, is directed to providing a vehicle which ensures a higher safety of the passenger in the vehicle compartment in the small overlap crash test.

SUMMARY OF THE INVENTION

In accordance with an aspect of the present invention, there is provided a vehicle including a vehicle body having a front wheel housing, an axle, a disk wheel fixed to the axle in the front wheel housing and a tire mounted on the disk wheel. The vehicle further includes a breaking member that is provided projecting from the vehicle body toward the disk wheel. The breaking member breaks the disk wheel when the vehicle body is crashed at a front thereof at a predetermined speed or higher.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE EMBODIMENTS

The following will describe embodiments of the present invention with reference to the drawings.

Figure 1A:
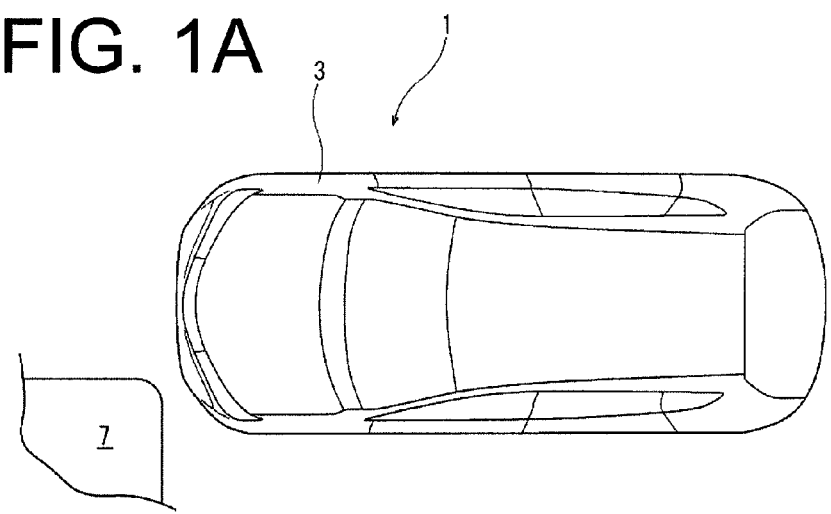
FIGS. 1A and 1B are top views of a vehicle according to a first embodiment of the present invention before and after crashing against a barrier, respectively.
Figure 1B:
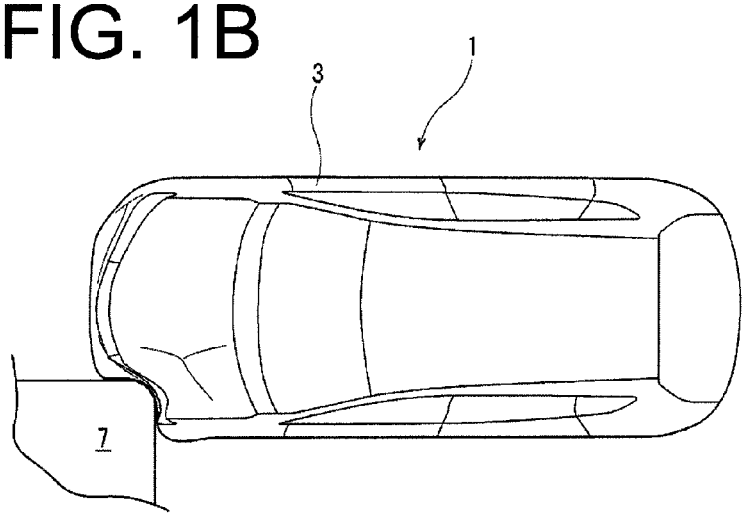
Figure 2:
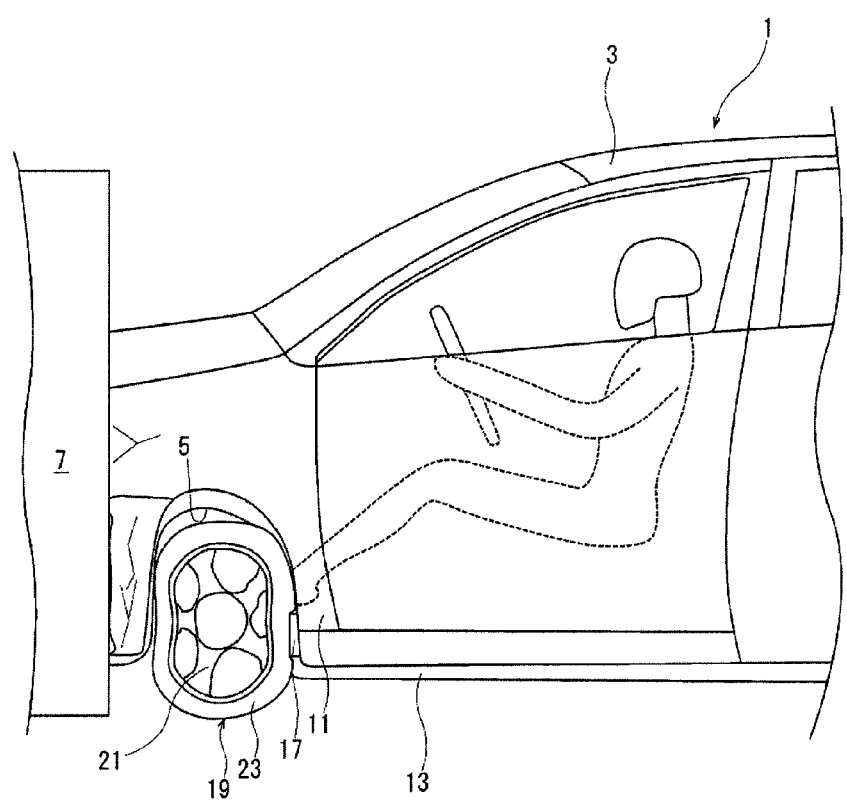
FIG. 2 is a side view of the vehicle of FIG. 1B.

Referring to FIGS. 1A, 1B and 2, there is shown a vehicle of a first embodiment which is designated generally by numeral 1. The vehicle 1 includes a vehicle body 3 and a front wheel housing 5 is formed in the vehicle body 3. As shown in FIG. 1A, a barrier 7 is provided ahead of the vehicle 1. The barrier 7 is set at such a location that a part of the front of the vehicle body 3 having a predetermined dimension as measured in vehicle width direction is crashed against the barrier 7. The dimension should be approximately twenty five percent of the vehicle width.

Figure 4A:
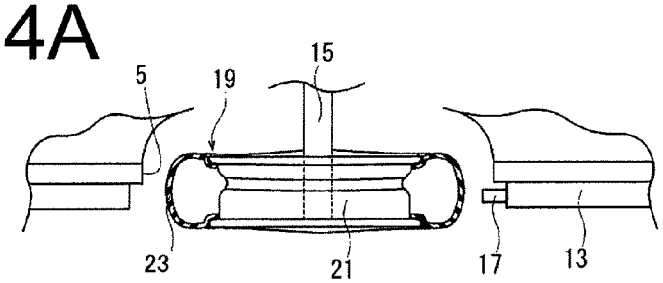
FIG. 4A is a cross-section view of the vehicle taken along line I-I of FIG. 3A.

As shown in FIG. 2, the vehicle body 3 has a front pillar 11 and a side sill 13. The front pillar 11 has a columnar portion extending vertically. The side sill 13 is connected to the lower end of the front pillar 11 and extends horizontally and rearwardly. The front pillar 11 and the side sill 13 have a strength that is great enough to ensure the rigidity of the passenger compartment of the vehicle 1. The vehicle 1 has an axle 15 extending in the front part of the vehicle body 3 in vehicle width direction, as shown in FIG. 4A.

Figure 3A:
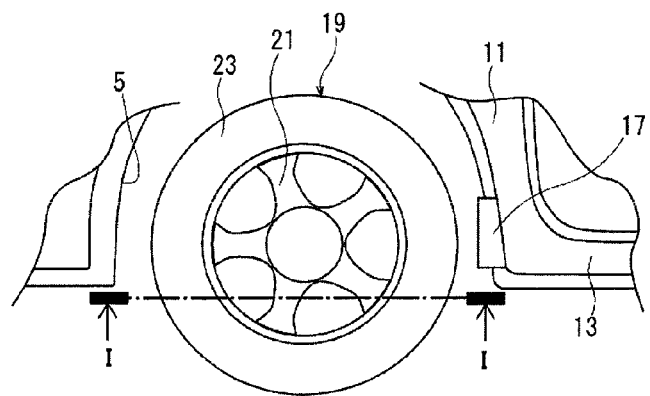
FIGS. 3A and 3B are partially enlarged side views of FIGS. 1A and 1B, respectively, showing a state of a tire and a disk wheel.

As shown in FIG. 3A, the front wheel housings 5 are provided on opposite sides of the vehicle body 3 in the lower part thereof. The lower end of the front pillar 11 and the front end of the side sill 13 are positioned rearward of the front wheel housing 5.

The front wheel housing 5 accommodates therein a wheel 19, and the wheel 19 includes a disk wheel 21 and a tire 23.

The disk wheel 21 is made of a metal such as aluminum, steel and magnesium. The disk wheel 21 is supported rotatably by the axle 15 at each end thereof. The strength of the side sill 13 is higher than that of the disk wheel 21. The tire is mounted on the outer periphery of the disk wheel 21. As shown in FIG. 2, there is provided a breaking member 17 in the front wheel housing 5.

The breaking member 17 is made of a metal bar with a rectangular cross section, as shown in FIG. 3A. The breaking member 17 is fixed to the front end of the side sill 13 in such a position that the long side of the rectangular cross section of the bar extends vertically upward along the front pillar 11 in the front wheel housing 5 and the short side of the bar extends horizontally toward the front wheel 19. In other words, the breaking member 17 is provided projecting from the vehicle body 3 toward the disk wheel 21, that is, the breaking member 17 extends forward from a rear end of the front wheel housing 5 in the front wheel housing 5. The breaking member 17 is formed with such a size that no contact thereof with tire 23 occurs before the crash. The breaking member 17 is preferably provided in the rear end of the front wheel housing 5 and extends forward therefrom. In such case, the breaking member 17 is brought into contact with the disk wheel 21 with increased certainty when the vehicle body 3 at the front thereof is crashed to the barrier 7, thus breaking the disk wheel 21 more easily.

Figure 3B:
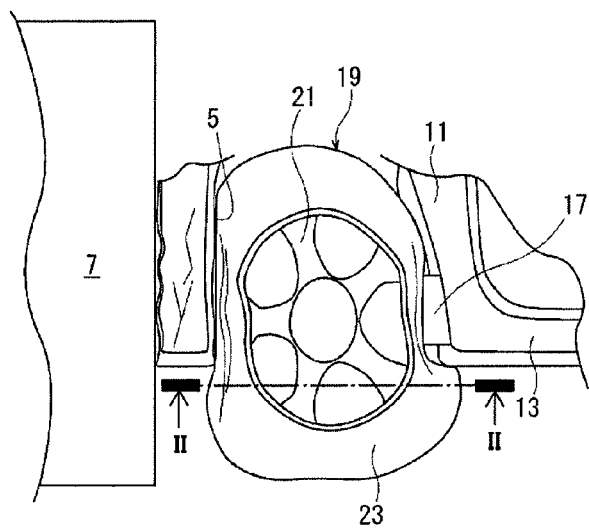

When the vehicle 1 configured as described above is crashed against the barrier 7 at a predetermined speed or higher, a part of the front of the vehicle body 3 is broken, as shown in FIG. 1B. The wheel 19 is displaced rearward in the front wheel housing 5, thus colliding against the breaking member 17 being positioned between the barrier 7 and the side sill 13 as shown in the FIG. 3B. In other words, That is, the breaking member 17 breaks the disk wheel 21 when the vehicle body 3 is crashed at the front thereof at the predetermined speed or higher.

Figure 4B:
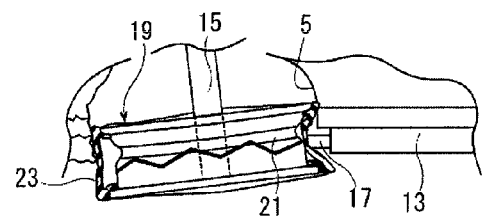
FIG. 4B is a cross-section view of the vehicle taken along line II-II of FIG. 3B.

The side sill 13 has a strength that is higher than that of the disk wheel 21 and has at the front end thereof the breaking member 17. Therefore, the disk wheel 21 is broken before the side sill 13 as shown in FIG. 4B. The presence of the breaking member 17 causes the disk wheel 21 to be broken regardless of the tire 23.

In the vehicle 1 of the present embodiment, the impact energy created by the crashing is absorbed by the deformation of the tire 23 and breakage of the disk wheel 21. Furthermore, the broken disk wheel 21 is not likely to remain in the front wheel housing 5, so that the passenger compartment of the vehicle 1 is free from influence of the broken disk wheel 21.

Thus, the vehicle 1 of the present embodiment ensures higher safety of passenger in the passenger compartment of the vehicle 1 in the small overlap test.

Figure 5A:
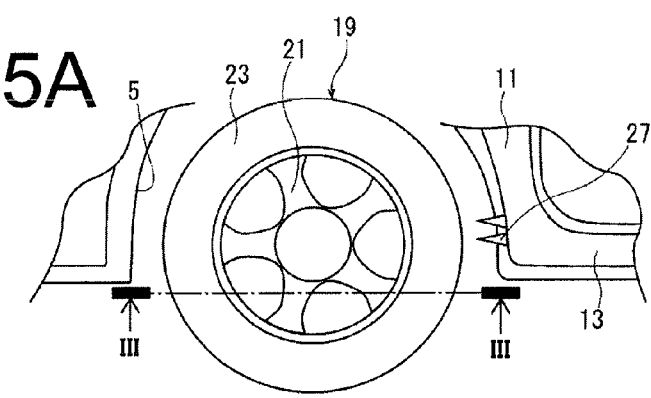
FIG. 5A is similar to FIG. 3A, but showing a vehicle according to a second embodiment.
Figure 5B:
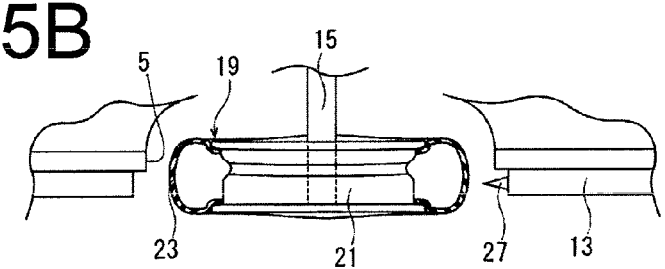
FIG. 5B is a cross-section view of the vehicle taken along line III-III of FIG. 5A.

Referring to FIGS. 5A and 5B showing the second embodiment of the present invention, the vehicle 1 is provided at the front end of the side sill 13 thereof with two breaking members 27, each of which has a sharpened end. The rest of the configuration of the vehicle 1 according to the second embodiment is substantially the same as that of the vehicle 1 of the first embodiment. It is preferable that the breaking members 27 have a sharpened end. In such case, the disk wheel 21 is broken with increased certainty when the vehicle body 3 crashes against the barrier 7. The breaking members 27 having a sharpened end may be formed in a conical shape, a square pyramid shape and an ax shape.

When the vehicle body 3 of this vehicle 1 is crashed against the barrier 7, the disk wheel 21 is broken with increased certainty. The rest of the effect of the vehicle 1 of the second embodiment is substantially the same as that of the vehicle 1 of the first embodiment.

Figure 6A:
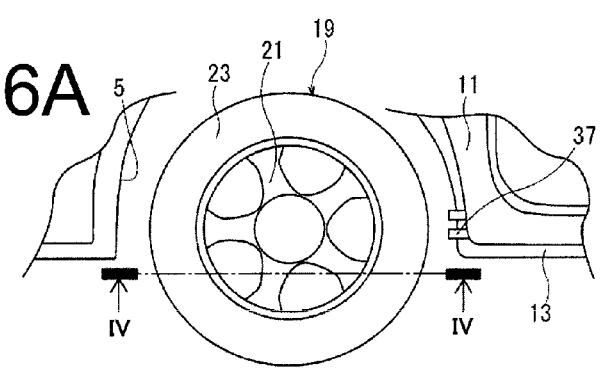
FIG. 6A is similar to FIG. 3A, but showing a vehicle according to a third embodiment.
Figure 6B:
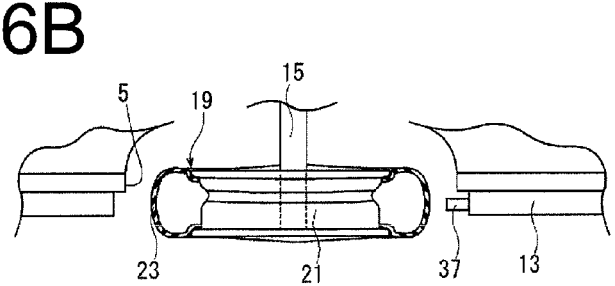
FIG. 6B is a cross-section view of the vehicle taken along line IV-IV of FIG. 6A.

Referring to FIGS. 6A and 6B showing the vehicle 1 of third embodiment of the present invention, the vehicle body 3 is provided with two breaking members 37 at the front end of the side sill 13. A projecting member such as a stud bolt and a weld nut is usable as the breaking member 37. The rest of the configuration and the effect of the vehicle 1 of the third embodiment are substantially the same as those of the vehicle 1 of the first embodiment.

Although the present invention has been described with reference to the first, the second and the third embodiments, the present invention is not limited to these embodiments, but it may be modified in various manners within the scope of the invention, as exemplified below.

The breaking member such as 17, 27, 37 need not be provided projecting in horizontal direction. The breaking members may be disposed in any location and may not project out in the front wheel housing 5 as long as the disk wheel 21 is broken by the projecting member in the front wheel housing 5 when the vehicle body 3 is crashed against a barrier.

The breaking members 17, 27, 37 may be formed in the front wheel housing 5 at a position that is frontward of the disk wheel 21. In addition, the number of the breaking members 17, 27, 37 is not limited to one or two, but three projecting member or more may be provided.

The breaking members 17, 27, 37 may be made of metal such as steel and hard alloy. The crashing of the barrier 7 and the vehicle 1 may occur relatively, that is, the vehicle 1 may is moved forward and crashed against the non-moving barrier 7, or the barrier 7 may be moved backward and crashed against the non-moving vehicle 1.

The present invention is applicable to a vehicle.

What is claimed is:

1. A vehicle comprising;
    a vehicle body having a front wheel housing;
    an axle;
    a disk wheel fixed to the axle in the front wheel housing; and
    a tire mounted on the disk wheel;
    wherein a breaking member is provided projecting from the vehicle body toward the disk wheel, wherein the breaking member breaks the disk wheel when the vehicle body is crashed at a front thereof at a predetermined speed or higher, and wherein the breaking member is configured to break the disk wheel such that the disk wheel does not remain in the front wheel housing.

2. The vehicle according to claim 1, wherein the breaking member extends forward from a rear end of the front wheel housing.

3. The vehicle according to claim 1, wherein the breaking member has a sharpened end.

* * * * *